US007133673B2

(12) United States Patent
Zeira et al.

(10) Patent No.: US 7,133,673 B2
(45) Date of Patent: Nov. 7, 2006

(54) METHOD AND SYSTEM FOR DETERMINING CORRECT ESCAPE MECHANISMS AND CONTROLLING INTERFERENCE IN THIRD GENERATION WIRELESS SYSTEMS

(75) Inventors: Eldad Zeira, Huntington, NY (US); Teresa Hunkeler, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 520 days.

(21) Appl. No.: 10/608,280

(22) Filed: Jun. 27, 2003

(65) Prior Publication Data
US 2004/0092232 A1    May 13, 2004

Related U.S. Application Data

(60) Provisional application No. 60/406,406, filed on Aug. 27, 2002, provisional application No. 60/392,595, filed on Jun. 28, 2002.

(51) Int. Cl.
    *H04Q 7/20* (2006.01)
(52) U.S. Cl. .............. 455/436; 455/437; 455/438; 455/450; 455/451; 455/452.1; 455/452.2; 455/453; 370/330; 370/331
(58) Field of Classification Search ............ 455/436, 455/453, 437, 438, 439, 450–452.2, 509, 455/512; 370/330, 331, 329, 337, 319; 375/148
    See application file for complete search history.

(56) References Cited

U.S. PATENT DOCUMENTS

| | | | |
|---|---|---|---|
| 5,239,682 A * | 8/1993 | Strawcynski et al. ....... | 455/436 |
| 5,579,306 A * | 11/1996 | Dent ........................... | 370/330 |
| 5,594,949 A * | 1/1997 | Andersson et al. .......... | 455/437 |
| 5,666,651 A * | 9/1997 | Wang .......................... | 455/512 |
| 5,963,865 A * | 10/1999 | Desgagne et al. .......... | 455/450 |
| 6,301,478 B1 * | 10/2001 | Wallstedt et al. ........... | 455/436 |
| 6,542,493 B1 | 4/2003 | Moerder | |
| 6,868,277 B1 * | 3/2005 | Cerwall et al. ............. | 455/509 |
| 6,996,078 B1 * | 2/2006 | Pan et al. .................. | 370/329 |
| 2002/0122406 A1 * | 9/2002 | Chillariga et al. .......... | 370/347 |
| 2002/0131483 A1 * | 9/2002 | Papasakellariou ........... | 375/148 |
| 2002/0168983 A1 * | 11/2002 | Kumaran et al. ........... | 455/446 |
| 2003/0054829 A1 | 3/2003 | Moisio | |
| 2004/0028015 A1 * | 2/2004 | Fouilland et al. ........... | 370/337 |

FOREIGN PATENT DOCUMENTS

EP    1 077 582    2/2001

OTHER PUBLICATIONS

Miao et al., "The Coexistence of UTRA-TDD and FDD System in the Adjacent Channel", IEEE, 2001, pp. 3714-3718.
Lee et al., "Impact of FDD/TDD Co-Existence on Overall UMTS System Performance", IEEE, 2001, pp. 2655-2659.

(Continued)

*Primary Examiner*—Steve M. D'Agosta
(74) *Attorney, Agent, or Firm*—Volpe and Koenig, P.C.

(57) ABSTRACT

A correct escape mechanism is determined according to interference type. Transmission is arranged so that interference may be measured at all time slots as needed to compute a measure of variance in interference in time slots. If the variance is above a predetermined value, time division duplex escape mechanisms are employed. If the variance is below a predetermined value, appropriate escape mechanisms are employed depending on whether the escape mechanism is being implemented during an uplink or downlink. Interference causing FDD WTUs may be handed over to carrier bands to control interference experienced by TDD users.

21 Claims, 5 Drawing Sheets

OTHER PUBLICATIONS

Miao et al., "The Coexistence of UTRA-TDD and FDD System in the Adjacent Channel", IEEE, 2001, pp. 3714-3718.

Lee et al., "Impact of FDD/TDD Co-Existence on Overall UMTS System Performance", IEEE, 2001, pp. 2655-2659.

Haas et al. "The Effects of Interference Between the TDD and FDD Mode in UMTS at the Boundary of 1920 MHz." Spread Spectrum Techniques and Applications, 2000 IEEE Sixth International Symposium, Sep. 6, 2000, pp. 486-490.

* cited by examiner

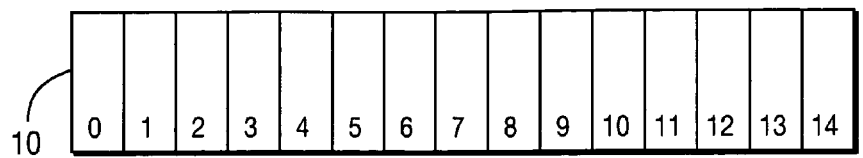
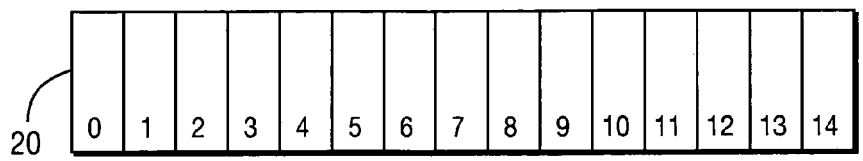
FIG. 1
PRIOR ART
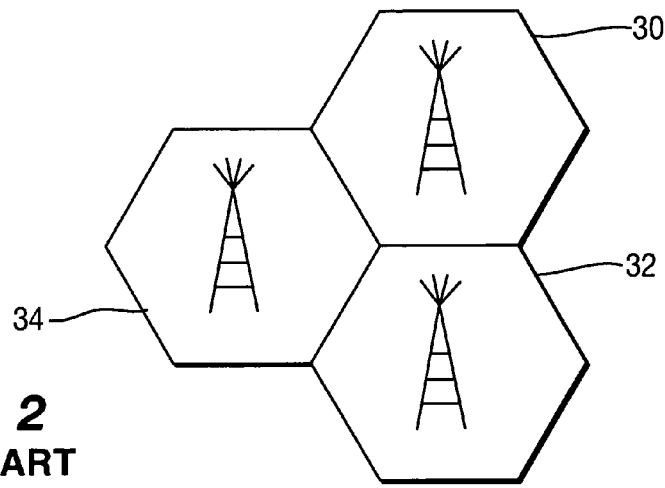
FIG. 2
PRIOR ART
FIG. 3
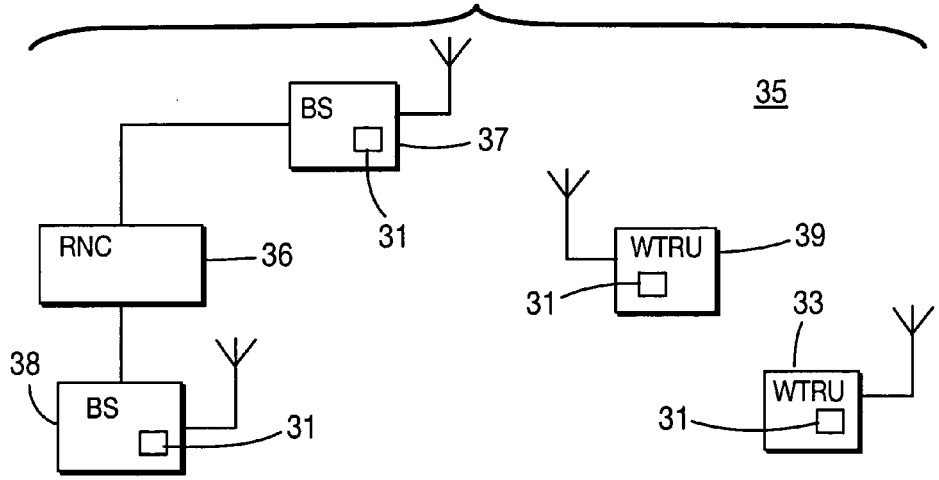

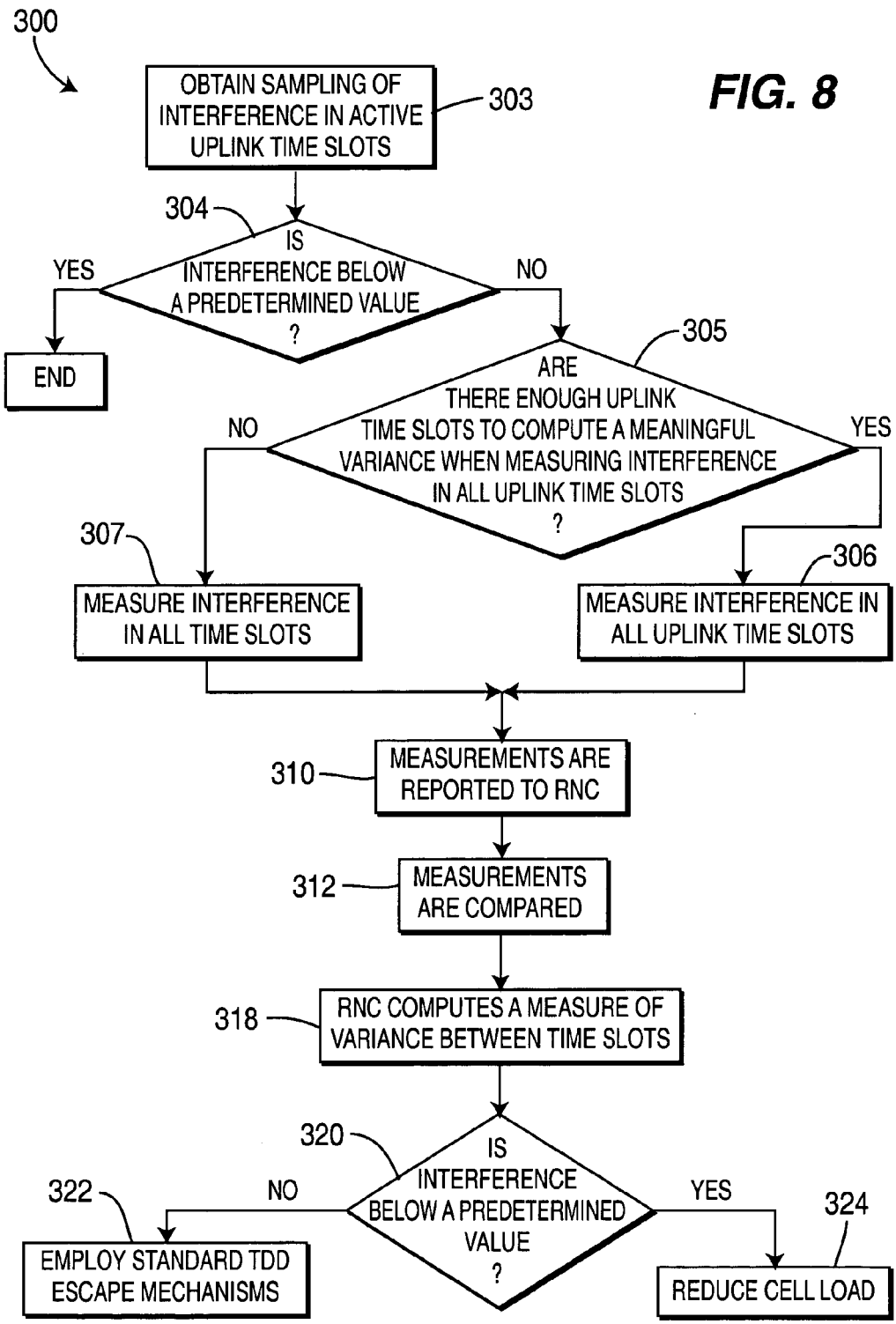

METHOD AND SYSTEM FOR DETERMINING CORRECT ESCAPE MECHANISMS AND CONTROLLING INTERFERENCE IN THIRD GENERATION WIRELESS SYSTEMS

CROSS REFERENCE TO RELATED APPLICATION(S)

This application claims priority from U.S. Provisional Application No. 60/392,595 filed Jun. 28, 2002, and U.S. Provisional Application No. 60/406,406 filed Aug. 27, 2002, which are incorporated by reference as if fully set forth.

FIELD OF INVENTION

The present invention is related to communication systems employing a time slot structure when operating in physical and spectral vicinity to other systems that employ continuous transmission. In particular, the invention is related to coexisting TDD/CDMA (UMTS) and FDD/CDMA (UMTS) systems.

BACKGROUND

In third generation cellular systems (3GPP), where UMTS FDD and UMTS-TDD spectra are both allocated, continuous (FDD) and discontinuous (TDD) transmissions are employed. In FDD mode, transmissions are continuous because each transmission is associated with a particular code and frequency. In TDD mode, the transmissions are discontinuous because each transmission is associated with not only a particular code and frequency but also a particular time slot. The uplink and downlink transmissions share the same frequency which is divided into time slots, with some time slots being used for the downlink and some time slots being used for the uplink. In 3GPP, an uplink is defined as the frequency at which a wireless transmit/receive unit (WTRU) transmits and a base station (BS) receives; and the downlink is defined as the frequency at which a BS transmits and a WTRU receives.

In FDD mode, transmissions may occur in A-bands and B-bands. The FDD A-band uplink range is 1920 to 1980 MHz while the downlink range is 2110 to 2170 MHz. The B-band uplink range is 1850 to 1910 MHz while the downlink range is 1930 to 1990 MHz. In TDD mode, transmissions may occur in A-, B-, and C-bands. The TDD A-band is 1900 to 1920 MHz and 2010 to 2025 MHz. The B-band is 1850 to 1910 MHz and 1930 to 1990 MHz. The C-band spans 1910 to 1930 MHz. It should be noted that the particular bands and frequencies identified in this paragraph may vary according to system deployment and are mentioned purely for example to illustrate that FDD and TDD bands may be adjacent to each other in certain cases.

Since the uplink bands of the FDD spectrum may be adjacent to TDD bands, TDD WTRUs and TDD BSs may experience not only discontinuous interference from the discontinuous transmissions of other TDD WTRUs and BSs but also continuous interference from the continuous transmissions of FDD WTRUs and BSs. The interference usually causes loss of signal strength resulting invariably in poor performance to the TDD user that is subject to the interference.

It would therefore be desirable to determine appropriate escape mechanisms and control interference in coexisting TDD/CDMA (UMTS) and FDD/CDMA (UMTS) systems.

SUMMARY

The present invention is a method and system for determining appropriate escape mechanisms based on interference type and for controlling continuous interference created by an FDD WTRU and/or BS that impacts TDD users. The method and system evaluates interference and, based thereon, determines appropriate escape mechanisms. In a preferred embodiment, continuous interference from a FDD WTRU is controlled by handing over the interference-causing FDD WTRU to another carrier band.

BRIEF DESCRIPTION OF THE DRAWINGS

FIG. 1 is a diagram of two TDD frames associated with particular carriers.

FIG. 2 is a diagram of neighboring cells in a wireless system.

FIG. 3 is a wireless system in accordance with the present invention.

FIG. 8 is a flow diagram of a method for determining interference type in the uplink and employing appropriate escape mechanisms.

DETAILED DESCRIPTION OF THE PREFERRED EMBODIMENT(S)

Figure 4:
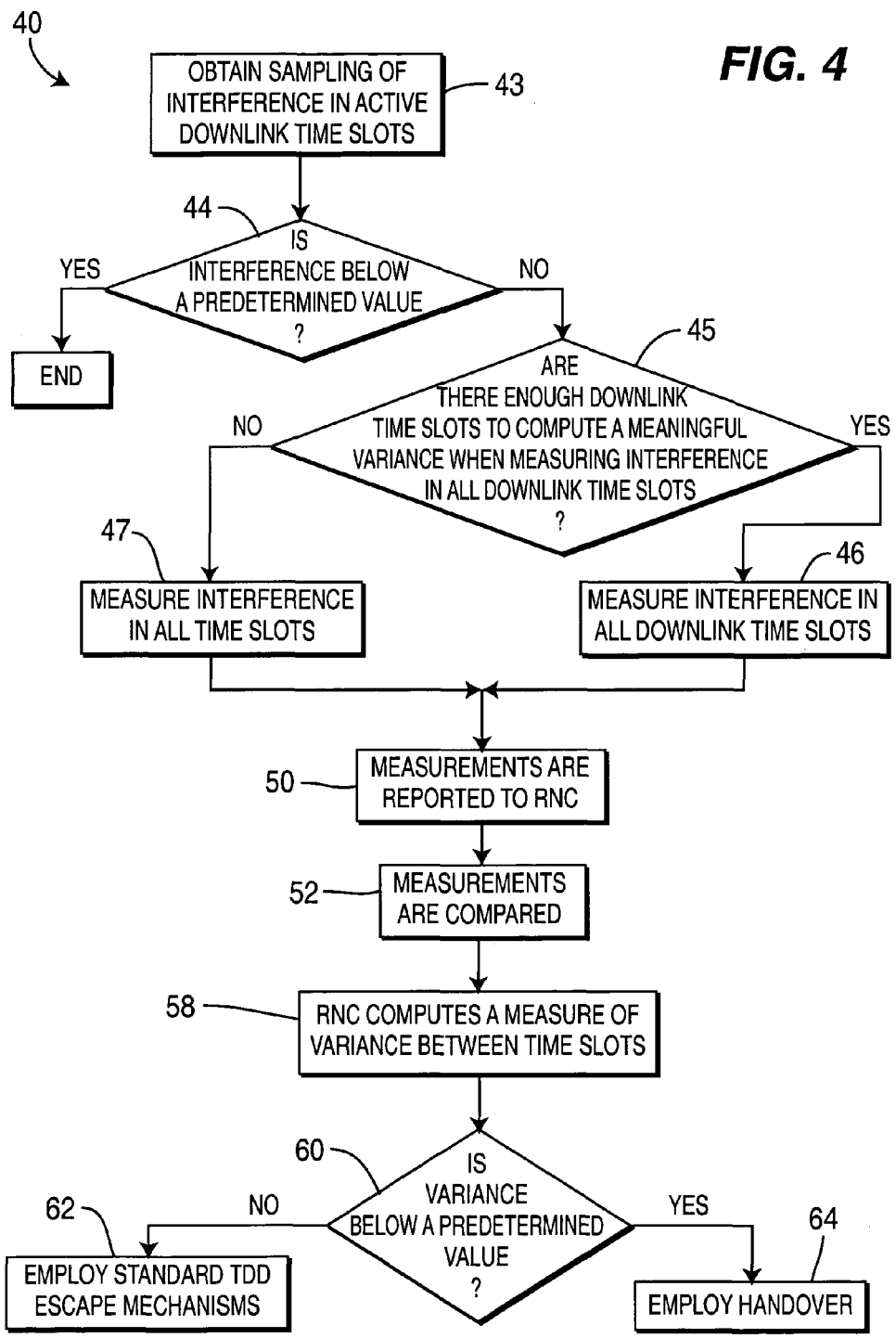
FIG. 4 is a flow diagram of a method for determining interference type in the downlink and employing appropriate escape mechanisms.

By way of introduction, a wireless transmit/receive unit (WTRU) as used herein includes, but is not limited to, a user equipment (UE), mobile station, fixed or mobile subscriber unit, pager, or any other type of client device capable of operating in any type of wireless environment. Exemplary types of wireless environments include, but are not limited to wireless local area networks (WLANs) and public land mobile networks (PLMNs). The WTRUs described herein are preferably capable of operating in both a time-slotted mode or a frequency divided mode, such as TDD and FDD, respectively. When referred to hereafter, a base station (BS) includes, but is not limited to a Node-B, site controller, access point or other type of interfacing device in a wireless environment.

Referring now to FIGS. 1 and 2, in TDD systems carriers are associated with a series of repeating time frames. For example, in FIG. 1 frame 10 may belong to a group of repeating time frames associated with a first carrier. Similarly, frame 20 may belong to a group of repeating time frames associated with a second carrier.

Each frame is broken down into a plurality of time slots. For example, as shown in FIG. 1, 3GPP frames are divided into 15 time slots wherein each time slot may be allocated uplink or downlink. Although each time slot may be allocated uplink or downlink, it is preferable, that neighboring cells synchronize their uplink and downlink transmissions so that the neighboring cells use the same time slots for either uplink or downlink.

For example, referring to FIG. 2, it is preferable for neighboring cells 30, 32, 34 to each use time slots 0 through 6 of frame 10 for downlink and time slots 7 through 14 of frame 10 for uplink. Such synchronization eliminates situations where interference is created because, for example, cell 30 is using time slot 0 for downlink and cell 32 is using time slot 0 for uplink. Although synchronization is preferred, it is quite common to have interference resulting from a lack of synchronization (i.e. un-synchronized interference.)

Referring to FIG. 3, a wireless system 35 in accordance with the present invention is shown. The system 35 includes at least one radio network controller 36 which may service base stations and WTRUs using time-slotted or non-time-slotted transmissions. The system 35 also includes a plurality of base stations 37, 38 and a plurality of WTRUs 39, 33. There may be any number of base stations 37, 38 and any number of WTRUs 39,33. Further the base stations 37, 38 and WTRUs 39,33 may be adapted for use in time-slotted wireless environments (eg. TDD) or non-time-slotted wireless environments (eg. FDD). The base stations 37, 38 and WTRUs 39, 33 include circuits 31 for performing various interference measurements and computations as explained herein. The RNC 36 is similarly adapted and may also coordinate with base stations 37, 38 and WTRUs 39, 33 to perform appropriate handovers to address interference in wireless systems as explained below.

Referring now to FIG. 4, a method 40 for determining interference type in the downlink and employing appropriate escape mechanisms in accordance with the present invention is shown. The method 40 begins in step 43 with obtaining a sampling of interference in the active downlink time slots. A WTRU will take interference measurements in, for example, two (2) or three (3) active downlink time slots. Although two (2) or three (3) active time slots is mentioned by way of example, any number of active time slots may be measured in order to obtain a sampling of the interference in the active downlink time slots of a particular frame. The determination of how many active time slots to measure is preferably based on operator preference and experience.

In step 44, the interference measurements taken in step 43 are evaluated to determine whether the interference in the measured downlink time slots is below a predetermined value. When making this determination, the measurements may be averaged or evaluated individually, as desired. If the interference is below a predetermined value, no further action to mitigate the effects of interference is necessary and the method 40 ends. If the interference is equal to or above the predetermined value, method 40 proceeds to step 45.

In step 45, it is determined whether there are enough downlink time slots to compute a meaningful variance if an interference measurement is done for all of the downlink time slots. The determination of whether there are enough downlink time slots to compute a meaningful variance is subjective and may be determined according to operator preference. For example, a time frame having five (5) downlink time slots may be considered as being not enough whereas a frame having ten (10) downlink time slots may be considered as being sufficient.

If it is determined that there are enough downlink time slots in step 45, the method proceeds to step 46. In step 46, the interference is measured in all of the downlink time slots. This may be accomplished, for example, by having a radio network controller (RNC) instruct a WTRU to regularly schedule interference measurements in all downlink time slots including those used for active downlink reception. If it is determined in step 45 that there are not enough downlink time slots, the method 40 proceeds to step 47. In step 47, the interference is measured in all of the time slots (i.e. all of the downlink time slots and all of the uplink time slots) to compensate for the lack of downlink time slots.

Measuring interference in uplink time slots is possible by appropriately scheduling the uplink transmission. The network operator preferably schedules uplink transmissions such that a sufficient number of uplink time slots are reserved every "X" amount of frames, as desired. For example, a predetermined number of uplink time slots may be reserved every other, or every third, frame for measuring interference in the uplink time slots. The reserved uplink time slots provide additional time slots (i.e. in addition to the downlink time slots) in which an WTRU may measure interference in a particular frame so as to obtain enough measurements, as needed, to compute a meaningful variance (i.e. whenever it is determined in step 45 that there are not enough downlink time slots). Of course, the frequency with which uplink time slots are reserved depends purely on operator preference and may be adjusted as desired.

When measuring interference there are many different types of interference measurements that may be made. For example, in TDD systems, the wide bandwith interference (formerly RSSI) measuring technique and the interference signal code power (ISCP) measuring technique may be used. The wide bandwidth interference measuring technique does not distinguish between inter cell interference (i.e. interference from outside a cell) and intra-cell interference (i.e. interference from inside a cell). Both measurements may be used although one may have certain performance advantages to the other as is evident to those skilled in the art. Other interference measurements may also be used as desired.

In step 50, the measurements taken by the WTRU in step 46 or step 47 are reported to an RNC either periodically or upon the crossing of some predetermined threshold. In the RNC, the measurements from all time slots are compared (step 52). Then, in step 58, the RNC computes a measure of variance between time slots to determine if the interference is discontinuous (eg. from a type of time-slotted transmission) or continuous (eg. from a type of continuous or non-time-slotted transmission). If the source of interference is discontinuous, then the interference level measured in all of the time slots will vary. If the source of the interference is continuous, then the interference level measured in all of the time slots will be similar.

Therefore, the next step (step 60) is to evaluate the measure of variance against a predetermined value. If the variance between the time slots is equal to or above the predetermined value, the interference is considered discontinuous and standard escape mechanisms for time-slotted transmissions (i.e. slot reallocation, dynamic channel allocation, dynamic channel selection, etc.) are employed (step 62). In this case, for example, the slotted nature of TDD transmissions causes the interference to be discontinuous. As a result, it is possible to measure the interference levels in different time slots and assign the transmissions to time slots where interference levels are low. Once assigned, the interference level can be continuously monitored. A rise of the interference level in the active time slots can cause a time slot reallocation to other time slots with lower interference levels. This mitigates the interference effects of other TDD systems.

If the variance is below the predetermined value, the interference is considered continuous and the user experiencing the interference may be handed over to another frequency or, where the user has appropriately configured hardware, to another mode (step 64). That is, where the interference emanates from a continuous source, such as an FDD system, slot reassignment will not reduce the interference level because the interference in each time slot will be the same. For these cases it may be necessary to move the WTRU to a different carrier frequency in TDD, using an inter-frequency handover. Where the mobile is capable of multiple modes (such as FDD within a TDD network, or other access technologies) then a handover to another mode may also be used.

Figure 5:
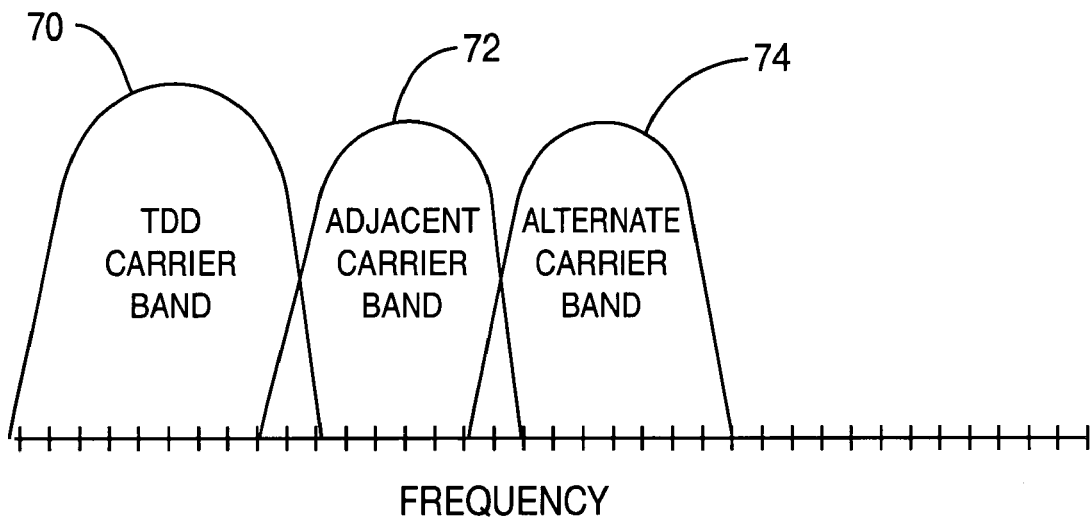
FIG. 5 is a diagram of adjacent and alternate carrier bands in accordance with the present invention.

Referring now to FIG. 5, FDD interference (i.e. continuous interference) impacting TDD users often occurs where a FDD WTRU is transmitting on a carrier in a carrier band 72 that is adjacent to a carrier band 70 being used by a TDD user. This situation typically arises where an FDD WTRU is proximate to a TDD WTRU or BS. Accordingly, a preferred embodiment of the invention is to refrain from handing over the TDD user, and instead handover the interference-causing FDD WTRUs from a carrier within the adjacent carrier band 72 to a carrier within the alternate carrier band 74. For purposes of describing the present invention, an adjacent carrier band 72 is defined as the FDD carrier band that is closest to the TDD carrier band 70 and an alternate carrier band 74 is defined as the FDD carrier band that, beside the adjacent carrier band 72, is closest to the TDD carrier band 70.

Figure 7:
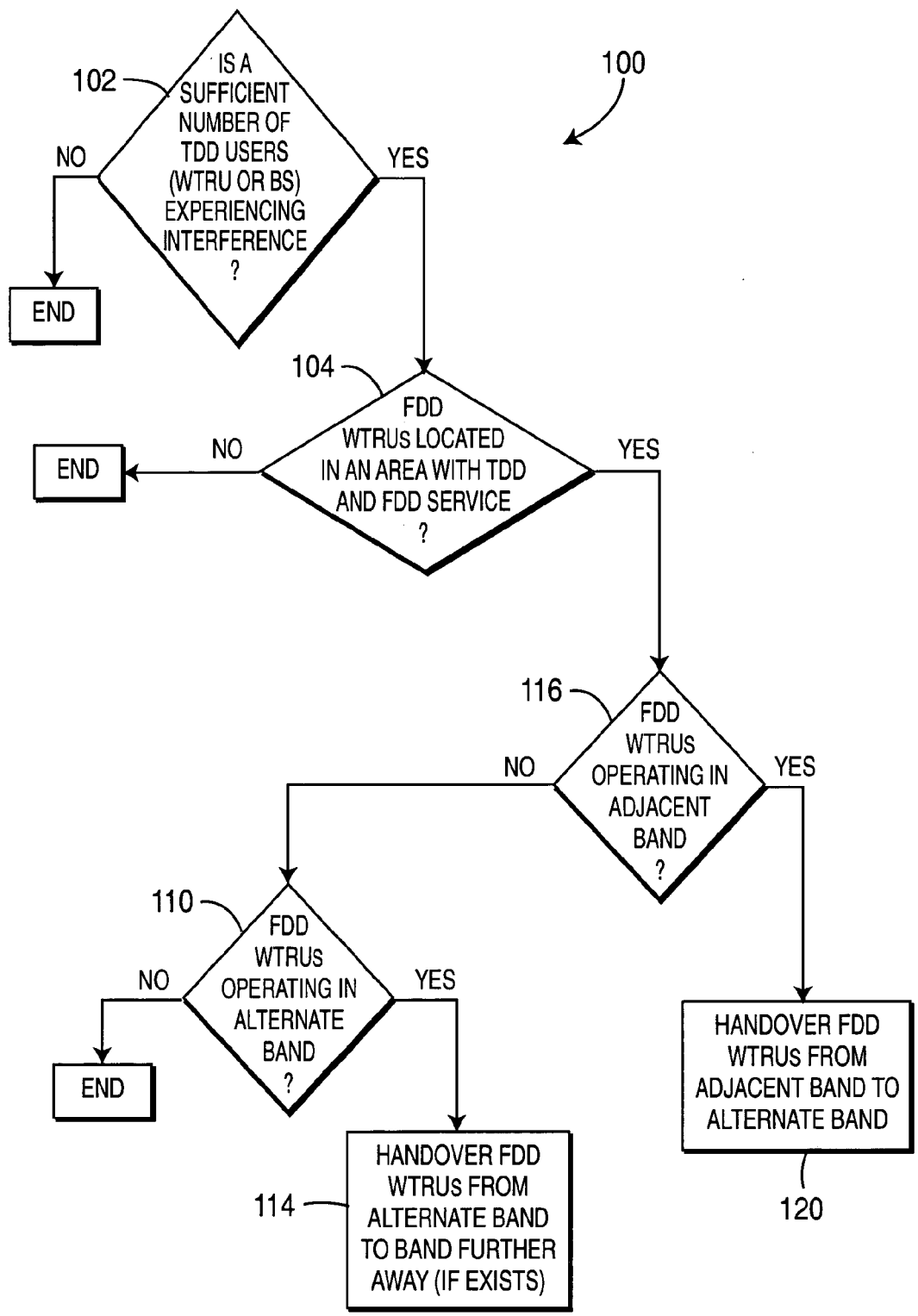
FIG. 7 is a flow diagram of a method for controlling interference created by FDD WTRUs in joint FDD TDD systems.

This embodiment controls interference created by FDD WTRUs operating in areas where there is joint FDD and TDD service. This embodiment may be implemented in conjunction with either method 40 (FIG. 3) or method 300 (FIG. 7).

Figure 6:
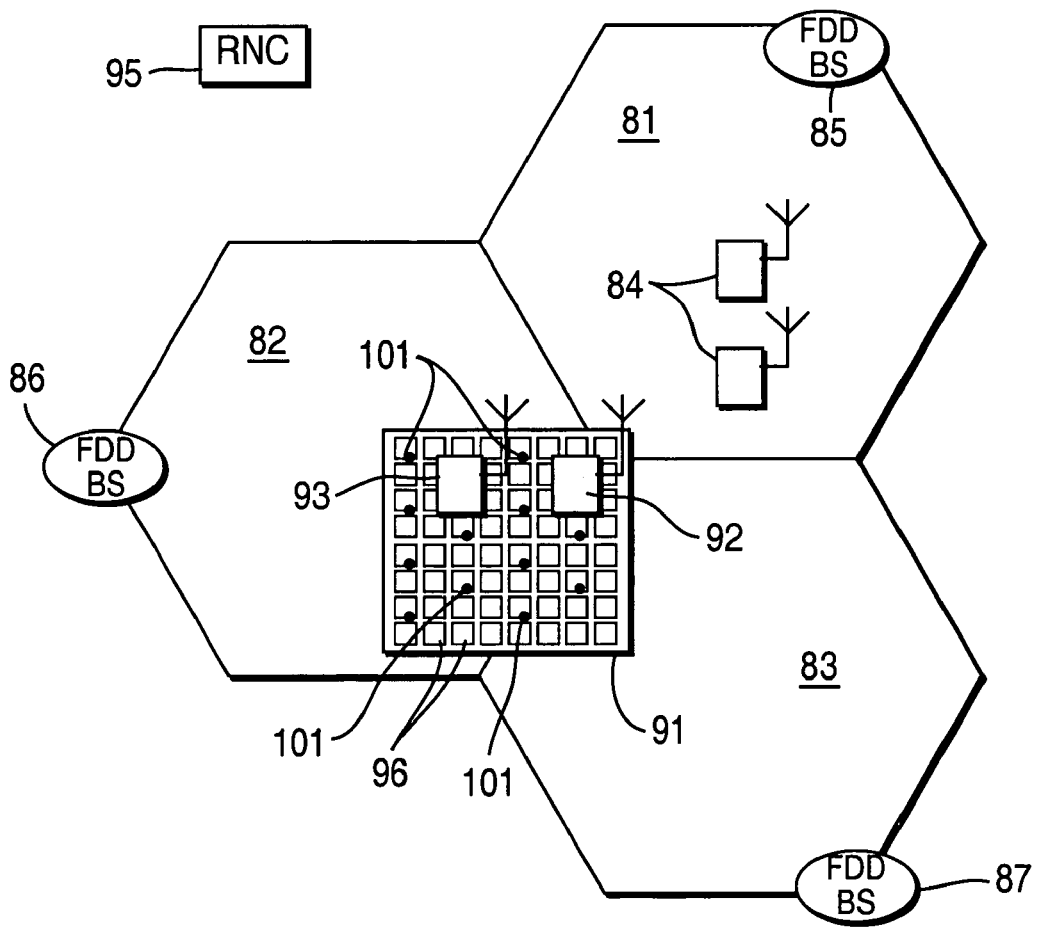
FIG. 6 is a diagram of coexisting TDD/CDMA (UMTS) and FDD/CDMA (UMTS) systems.

In FIG. 6, three (3) neighboring FDD cells are shown within a network having coexisting TDD/CDMA (UMTS) and FDD/CDMA (UMTS) systems. The cells 81, 82, 83 are adjacent to each other and accommodate three (3) FDD BSs 85, 86, 87. For purposes of the preferred embodiment, it is assumed that TDD coverage is provided in localized areas inside larger FDD coverage areas. Therefore, as shown in FIG. 5, an area 91 containing TDD "hot spots" 96 (i.e. areas where TDD service is available) which are established by TDD base stations 101. As can be seen, the "hot spots" 96 in area 91 overlap areas 82 and 83 (and slightly overlap area 81).

Where there is no TDD service available, FDD WTRUs (such as WTRU 84) are preferably using the adjacent carrier band 72. Use of the adjacent carrier band 72 by FDD WTRUs in areas where there is no TDD service will not create interference for TDD users. Therefore, in this embodiment, FDD WTRUs 84 in non-TDD areas that are operating in the alternate carrier band 74 are handed over from the alternate carrier band 74 to the adjacent carrier band 72. This reserves bandwidth in the alternate carrier band 74 for handing over FDD WTRUs in TDD areas to the alternate carrier band 74.

Where TDD service is available (i.e. area 91), however, FDD WTRUs (such as WTRU 92) preferably avoid operating in the adjacent carrier band 72. Therefore, in this embodiment, FDD WTRUs 92 in TDD areas that are operating in the adjacent carrier band 72 are handed over from the adjacent carrier band 72 to the alternate carrier band 74. This minimizes the interference experienced by TDD users as a result of FDD WTRUs and reserves bandwidth in the adjacent carrier band 72 for handing over FDD WTRUs in non-TDD areas to the adjacent carrier band 72.

Therefore, as explained above, this embodiment may be implemented by determining that a TDD WTRU 93 or BS is experiencing interference; determining that an FDD WTRU 92 is in an TDD area (i.e. an area such as area 91 of FIG. 5) and causing interference; determining the location of the FDD WTRU 92, communicating the location to a relevant RNC 95; and enabling a handover of the carrier band for the located FDD WTRU 92 so as to minimize the interference. It is important to note that the RNC 95 includes circuits for not only controlling interference as explained above and in more detail in connection with FIG. 6, but also for evaluating interference and determining appropriate escape mechanisms as described in method 40 (FIG. 4) and method 300 (FIG. 8).

Referring now to FIG. 7, a method 100 is shown for implementing this embodiment wherein interference from a FDD WTRU is controlled through the use of adjacent and alternate carrier bands. To begin, in step 102, it is determined whether a sufficient number of TDD users (i.e. either a TDD WTRU or a TDD BS, for example) are experiencing interference. If not, the method 100 ends. If so, the method 100 proceeds to step 104. In step 104, it is determined whether FDD WTRUs are located in an area with TDD and FDD service (i.e. an area such as area 91 in FIG. 5).

Where FDD WTRUs are not located in areas with TDD and FDD service, the method 100 ends. Where there are FDD WTRUs located in areas with TDD and FDD service, the method 100 proceeds to step 116. In step 116, it is determined whether there are FDD WTRUs operating in the adjacent carrier band, as previously explained in connection with FIGS. 5 and 6.

If the determination in step 116 is positive, the FDD WTRUs are handed over from the adjacent carrier band to the alternate carrier band in step 120. If the determination in step 116 is negative, the method proceeds to step 110. In step 110, it is determined whether there are FDD WTRUs operating in the alternate carrier band. If no, the method 100 ends. If yes, those FDD WTRUs are handed over from the alternate band to a band that is further away than both the adjacent band and the alternate band. This handover may only be done where such a band exists.

It is important to note that the determination made in step 102 may be made in accordance with method 40 as shown in FIG. 4 or by implementing prior art techniques for simply detecting the presence of interference. Where method 40 is used for the determination made in step 102, the method 100 may optionally (i.e. according to operator preference) be terminated if it is confirmed that the interference is discontinuous (i.e. from a time-slotted transmission). This is because if the interference is determined to be discontinuous, the interference is from a TDD WTRU or BS and there most likely are not any interference causing FDD WTRUs in an area with TDD and FDD service.

As previously described, FIG. 4 is a method 40 for determining interference type in the downlink and employing appropriate escape mechanisms based on interference type. Referring now to FIG. 8, a similar method 300 is shown for determining interference type in the uplink and employing appropriate escape mechanisms again based on interference type in accordance with the present invention.

Method 300 begins in step 303 wherein a sampling of interference in the active uplink time slots is obtained. A BS will take interference measurements in, for example, two (2) or three (3) active uplink time slots. Although two (2) or three (3) active time slots is mentioned by way of example, any number of active time slots may be measured in order to obtain a sampling of the interference in the active uplink time slots of a particular frame. The determination of how many active time slots to measure is preferably based on operator preference and experience.

In step 304, the interference measurements taken in step 303 are evaluated to determine whether the interference in the measured uplink time slots is below a predetermined value. When making this determination, the measurements may be averaged or evaluated individually, as desired. If the interference is below a predetermined value no further action to mitigate the effects of interference is necessary and the method 300 ends. If the interference is equal to or above the predetermined value, method 300 proceeds to step 305.

In step 305, it is determined whether there are enough uplink time slots to compute a meaningful variance if an interference measurement is done for all of the uplink time slots. The determination of whether there are enough uplink time slots to compute a meaningful variance is subjective and may be determined according to operator preference. For example, a time frame having five (5) uplink time slots may be considered as being not enough whereas a frame having ten (10) uplink time slots may be considered as being sufficient.

If it is determined that there are enough uplink time slots in step 305, the method proceeds to step 306. In step 306, the interference is measured in all of the uplink time slots. This may be accomplished, for example, by having the RNC instruct a BS to regularly schedule interference measurements in all uplink time slots including those used for active uplink reception. If it is determined in step 305 that there are not enough uplink time slots, the method 300 proceeds to step 307. In step 307, the interference is measured in all of the time slots (i.e. all of the downlink time slots and all of the uplink time slots) to compensate for the lack of uplink time slots.

Measuring interference in downlink time slots is possible by appropriately scheduling downlink transmission as explained in connection with the scheduling of uplink transmission in method 40. In this embodiment, however, because uplink interference is being evaluated, the network operator preferably schedules downlink transmission so that a sufficient number of downlink time slots are reserved every "X" amount of frames, as desired. For example, a predetermined number of downlink time slots may be reserved every other or every third frame for measuring interference in the downlink time slots. The reserved downlink time slots allow a BS to measure interference in all of the time slots (i.e. uplink and downlink) of a particular frame as needed (i.e. whenever it is determined in step 305 that there are not enough uplink time slots). Of course, as with method 40, the frequency with which downlink time slots are reserved depends purely on operator preference and may be adjusted as desired. Further, the techniques used by a BS for measuring interference in method 300 are the same as used by a WTRU for measuring interference in method 40.

Next, in step 310, the measurements taken by the BS are reported to an RNC either periodically or upon the crossing of some predetermined threshold. In the RNC, the measurements from all time slots are compared (step 312). Then, in step 318, the RNC computes a measure of variance between time slots to determine if the interference is discontinuous (i.e. from a type of time-slotted transmission) or continuous (i.e. from a type of continuous or non-time-slotted transmission). If the source of interference is discontinuous, then the interference level measured in all of the time slots will vary. If the source of the interference is continuous, then the interference level measured in all of the time slots will be similar.

Therefore, the next step (step 320) is to evaluate the measure of variance against a predetermined value. If the variance between the time slots is equal to or above the predetermined value, the interference is considered discontinuous and standard escape mechanisms for time-slotted transmissions (i.e. slot reallocation, dynamic channel allocation, dynamic channel selection, etc.) are employed (step 322), as explained in connection with step 62 of method 40.

If the variance is below the predetermined value, the interference is considered continuous and the cell load in all time slots is reduced (step 324). WTRUs that are assigned to a cell having its cell load reduced may be handed over to TDD cells in other frequencies or to other modes.

Although the preferred embodiments are described in conjunction with a third generation partnership program (3GPP) wideband code division multiple access (W-CDMA) system utilizing the time division duplex mode, the embodiments are applicable to any hybrid code division multiple access (CDMA)/time division multiple access (TDMA) communication system. Additionally, some embodiments are applicable to CDMA systems, in general, using beamforming, such as the proposed frequency division duplex (FDD) mode of 3GPP W-CDMA.

Although the present invention has been described in detail, it is to be understood that the invention is not limited thereto, and that various changes can be made therein without departing from the scope of the invention, which is defined by the attached claims.

What is claimed is:

1. A method for minimizing interference in a wireless communication system employing both time division duplex (TDD) and frequency division duplex (FDD) modes, wherein a transmission between at least one base station and at least one wireless transmit/receive units (WTRUs) occurs in a plurality of time-slots, the method comprising:
    measuring interference in at least two of said time slots;
    computing the variance of said measured interference between said time slots if said measured interference in active slots is above a first predetermined value (to determine if the interference is continuous or discontinuous);
    employing TDD escape mechanisms if the variance is above a second predetermined value indicating the measured interference is discontinuous; and
    employing a handover escape mechanism if the variance is below the second predetermined value indicating the measured interference is continuous.

2. The method of claim 1 wherein the measure of variance is computed based on downlink time slots.

3. The method of claim 1 wherein the measure of variance is computed based on downlink time slots and uplink time slots.

4. The method of claim 1, wherein the TDD escape mechanism comprises time slot reallocation.

5. The method of claim 1, wherein the TDD escape mechanism comprises dynamic channel allocation.

6. The method of claim 1, wherein the TDD escape mechanism comprises dynamic channel selection.

7. The method of claim 1, wherein the handover escape mechanism comprises inter-frequency handover.

8. The method of claim 1, wherein the WTRU experiencing the continuous interference is dual mode capable, and the handover escape mechanism comprises inter-mode handover.

9. A method for evaluating uplink interference to determine a correct escape mechanism according to interference type in a wireless communication system employing both time division duplex (TDD) and frequency division dunlex (FDD) modes, the method comprising:
    arranging uplink transmissions so that interference may be measured at all time slots;
    measuring interference to obtain a sampling of interference in the uplink time slots;

computing a measure of variance between time slots if interference in active slots is above a first predetermined value; employing time division duplex escape mechanisms if the computed variance is not below a second predetermined value; and reducing cell load if the variance is below the second predetermined value.

10. The method of claim 9 wherein the measure of variance is computed based on uplink time slots.

11. The method of claim 9 wherein the measure of variance is computed based on uplink time slots and downlink time slots.

12. A method for determining an appropriate escape mechanism based on a type of interference encountered during a transmission, the method comprising:
   receiving transmissions of a predetermined signal category;
   arranging said transmissions to a predetermined group of slots, so that interference may be measured at all of said slots;
   measuring interference at all of said slots;
   time averaging the measured interference to create time averaged values, and transmitting the time averaged values to a radio network controller; evaluating the time averaged interference measurements with respect to a first predetermined value;
   in the case of the interference measurements being below the first predetermined value, accepting the transmissions;
   in the case of the interference measurements being above the first predetermined value, computing a measure of variance between slots and evaluating the variance with respect to a second predetermined value;
   in the case of the interference variance being below the second predetermined value, executing a handover as an escape mechanism;
   in the case of the interference variance being above the second predetermined value for the variance, executing a TDD escape mechanism for discontinuous interference.

13. The method of claim 12, wherein the execution of the handover includes changing to a different carrier frequency.

14. The method of claim 12, wherein the execution of the handover includes changing to a different access mode.

15. The method of claim 12 comprising making the determination of the appropriate escape mechanism for an uplink transmission.

16. The method of claim 12 comprising making the determination of the appropriate escape mechanism for a downlink transmission.

17. The method of claim 12, wherein the measured interference includes uplink interference or downlink interference.

18. The method of claim 12 further comprising:
   determining if an FDD carrier band from a FDD WTRU exists in a TDD area and thereby causing said interference;
   determining a location of the FDD WTRU;
   communicating the location to a radio controller able to provide control of said FDD WTRU; and enabling a handover action for said FDD WTRU carrier band, thereby reducing interference caused by communications of the FDD WTRU.

19. The method of claim 12, wherein the TDD escape mechanism comprises:
   handing over WTRUs located in an area with TDD and FDD service and operating in a carrier band that is adjacent to a TDD carrier band from the adjacent carrier band to a carrier band that is alternate to the TDD carrier; and
   handing over WTRUs located in an area with FDD service and operating in the alternate carrier band from the alternate carrier band to the adjacent carrier band.

20. A dual mode wireless transmit and receive unit (WTRU) capable of operating in time division duplex (TDD) and frequency division duplex (FDD) modes for implementing an escape mechanism according to interference type, the WTRU comprising:
   an uplink transmitter;
   a circuit for measuring interference in a plurality of uplink time slots;
   a circuit for transmitting the measured interference to a radio network controller through the uplink transmitter, wherein the radio network controller computes a measure of variance between the time slots if interference in active time slots exceeds a predetermined value (to determine whether the interference is continuous or discontinuous); and
   a circuit for employing time division duplex escape mechanisms if the variance is above the predetermined value indicating the interference is discontinuous and employing a handover escape mechanism if the variance is below the predetermined value indicating the interference is continuous.

21. A radio network controller (RNC) for minimizing interference in a wireless communications network employing both time division duplex (TDD) and frequency division duplex (FDD) modes in which a plurality of wireless transmit and receive units (WTRUs) communicate with a plurality of base stations, and the WTRUs utilize an escape mechanism according to interference type, the RNC comprising:
   a circuit for scheduling transmission so that interference may be measured at all of a predetermined group of time slots;
   a circuit for providing measured interference to a radio network controller and computing a measure of variance between the time slots if interference in active time slots is above a predetermined value (to determine if the interference is continuous or discontinuous); and
   a circuit for employing TDD escape mechanisms in the case of the variance being above a predetermined value indicating the measured interference is discontinuous, and employing a handover escape mechanism in the case of the variance being below a predetermined value indicating the measured interference is continuous.

* * * * *

UNITED STATES PATENT AND TRADEMARK OFFICE
CERTIFICATE OF CORRECTION

PATENT NO. : 7,133,673 B2
APPLICATION NO. : 10/608280
DATED : November 7, 2006
INVENTOR(S) : Zeira et al.

It is certified that error appears in the above-identified patent and that said Letters Patent is hereby corrected as shown below:

ON THE FACE PAGE

At section (56), page 1, right column, U.S. PATENT DOCUMENTS, line 7, delete "6,996,078 B1 * 2/2006 Pan et al. ... 370/329" and insert therefor --6,996,078 B2 * 2/2006 Pan et al. ... 370/329--.

IN THE SPECIFICATION

At column 2, line 9, after the word "from", delete "a" and insert therefor --an--.

At column 4, line 12, after the word "which", delete "an" and insert therefor --a--.

At column 5, line 10, before "FDD", delete "a" and insert therefor --an--.

At column 5, line 36, after the word "FIG.", delete "5" and insert therefor --6--.

At column 5, line 65, before "TDD", delete "an" and insert therefor --a--.

At column 5, line 66, after the word "FIG.", delete "5" and insert therefor --6--.

At column 6, line 10, after the word "from", delete "a" and insert therefor --an--.

At column 6, line 18, after the word "FIG.", delete "5" and insert therefor --6--.

At column 6, line 33, after the word "away", delete "than" and insert therefor --from--.

IN THE CLAIMS

At claim 9, column 8, line 62, after the second usage of the word "division", delete "dunlex" and insert therefor --duplex--.

At claim 9, column 9, line 3, after the words "mined value;", begin new paragraph.

At claim 9, column 9, line 5, after the words "value; and", begin new paragraph.

At claim 12, column 9, line 23, after the word "controller;", begin new paragraph.

At claim 18, column 9, line 54, before "FDD", delete "a" and insert therefor --an--.

At claim 18, column 9, line 55, after the word "area", delete "and".

UNITED STATES PATENT AND TRADEMARK OFFICE
CERTIFICATE OF CORRECTION

PATENT NO. : 7,133,673 B2
APPLICATION NO. : 10/608280
DATED : November 7, 2006
INVENTOR(S) : Zeira et al.

It is certified that error appears in the above-identified patent and that said Letters Patent is hereby corrected as shown below:

At claim 18, column 9, line 59, after the words "WTRU; and", begin new paragraph.

At claim 21, column 10, line 39, before the second usage of the word "division", delete "freauency" and insert therefor --frequency--.

Signed and Sealed this

Seventeenth Day of April, 2007

JON W. DUDAS
*Director of the United States Patent and Trademark Office*